(12) United States Patent
Takeo

(10) Patent No.: US 7,187,789 B2
(45) Date of Patent: Mar. 6, 2007

(54) PROSPECTIVE ABNORMAL SHADOW DETECTING SYSTEM, AND METHOD OF AND APPARATUS FOR JUDGING WHETHER PROSPECTIVE ABNORMAL SHADOW IS MALIGNANT OR BENIGNANT

(75) Inventor: Hideya Takeo, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 737 days.

(21) Appl. No.: 09/943,347

(22) Filed: Aug. 31, 2001

(65) Prior Publication Data
US 2002/0062075 A1 May 23, 2002

(30) Foreign Application Priority Data
Aug. 31, 2000 (JP) ............................... 2000-262507
Aug. 31, 2000 (JP) ............................... 2000-262508

(51) Int. Cl.
G06K 9/00 (2006.01)
(52) U.S. Cl. ..................... 382/128; 128/920; 128/922
(58) Field of Classification Search ................ 382/128, 382/159, 130–132, 160, 170, 190, 199, 203, 382/256–265; 128/920, 922–925
See application file for complete search history.

(56) References Cited

U.S. PATENT DOCUMENTS

| 5,732,121 A | 3/1998 | Takeo et al. ................... 378/62 |
| 5,761,334 A | 6/1998 | Nakajima et al. ........... 382/132 |
| 5,768,333 A * | 6/1998 | Abdel-Mottaleb ........... 378/37 |
| 5,784,482 A * | 7/1998 | Nakajima .................... 382/132 |
| 5,799,100 A * | 8/1998 | Clarke et al. ............... 382/132 |
| 5,832,103 A * | 11/1998 | Giger et al. ................. 382/130 |
| 5,984,870 A * | 11/1999 | Giger et al. ................. 600/443 |
| 6,272,233 B1 * | 8/2001 | Takeo .......................... 382/128 |
| 6,631,204 B1 * | 10/2003 | Smith .......................... 382/130 |

FOREIGN PATENT DOCUMENTS

JP 2000-38298 2/2000

OTHER PUBLICATIONS

Brzakovic et al. "An approach to automated detection of tumors in mammograms", ☐ ☐Medical Imaging, IEEE Transactions on, vol. 9, Issue 3, Sep. 1990, pp. 233-241.*
Journal of Academy of Electronics/Information/Communication, D-II, vol. J75-D-II, No. 3, 1992.
Journal of Academy of Electronics/Information/Communication, D-II, vol. J75-D-II, No. 7, 1992.
JAMIT Frontier '99, pp. 89-93.

* cited by examiner

*Primary Examiner*—Bhavesh M. Mehta
*Assistant Examiner*—Christopher Lavin
(74) *Attorney, Agent, or Firm*—Sughrue Mion, PLLC

(57) ABSTRACT

A prospective abnormal shadow detecting system detects a prospective abnormal shadow in an image on the basis of image data representing the image and outputs information on the prospective abnormal shadow detected by the prospective abnormal shadow detecting means. Whether the detected prospective abnormal shadow is malignant or benignant is judged, and the information on the prospective abnormal shadow is output in such a manner that whether the prospective abnormal shadow is malignant or benignant can be distinguished.

3 Claims, 12 Drawing Sheets

FIG.4

| $f_7$ | $f_6$ | $f_5$ | $f_4$ | $f_3$ |
|---|---|---|---|---|
| $f_8$ | | | | $f_2$ |
| $f_9$ | | j | | $f_1$ |
| $f_{10}$ | | | | $f_{16}$ |
| $f_{11}$ | $f_{12}$ | $f_{13}$ | $f_{14}$ | $f_{15}$ |

F I G . 10

| i\j | 0 | 1 | 2 | 3 | 4 | 5 | 6 | 7 | 8 | 9 | 10 |
|---|---|---|---|---|---|---|---|---|---|---|---|
| 0 | 1 | | | | | | | | | | |
| 1 | | 1 | | | | | | | | | |
| 2 | | | | | | | | | | | |
| 3 | | | | | | | | | | | |
| 4 | | | | | | | | | | | |
| 5 | | | | 2 | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |

F I G. 12A
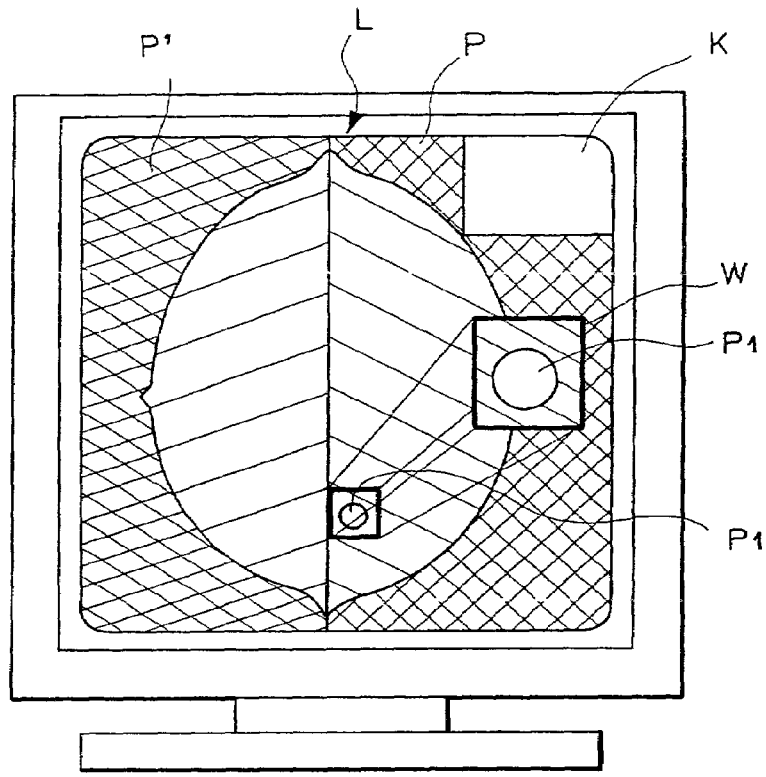
F I G. 12B
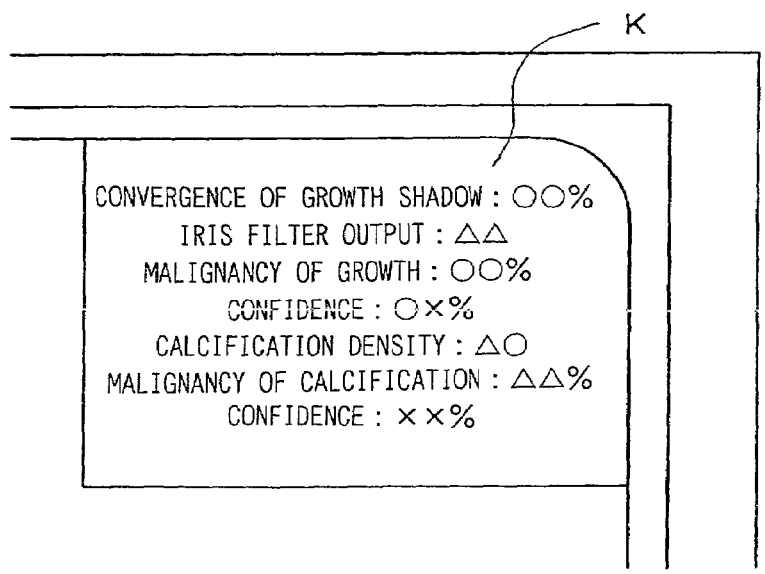

PROSPECTIVE ABNORMAL SHADOW DETECTING SYSTEM, AND METHOD OF AND APPARATUS FOR JUDGING WHETHER PROSPECTIVE ABNORMAL SHADOW IS MALIGNANT OR BENIGNANT

BACKGROUND OF THE INVENTION

1. Field of the Invention

This invention relates to a system for detecting a prospective abnormal shadow in a radiation image on the basis of image data representing the radiation image. This invention also relates to a method of and an apparatus for judging whether a prospective abnormal shadow is malignant or benignant.

2. Description of the Related Art

In the medical field and the like, there are cases where radiation image data is obtained from a radiation image of an object recorded on a photographic film, stimulable phosphor sheet and the like, suitable image processing is carried out on the image data and an image is reproduced on a display on the basis of the processed image data. Recently there have been developed various computer-aided digital image processing techniques. Also, various image input devices (image forming modality) such as a CT (computed tomography) apparatus, a MRI (magnetic resonance imaging) apparatus, a CR (computed radiography) apparatus and the like are used for forming diagnostic images.

The digital image processing techniques are basically different from the conventional analog image processing techniques in that the digital image processing techniques can quantitatively analyze image data. For example, there has been proposed an abnormal shadow detection processing technique called CADM (computer-aided diagnosis of medial image) which detects an abnormal shadow representing a growth, a micro calcification or the like by positively making use of the merit of the digital image processing technique. See, for instance, "Growth Shadow Detection in a DR image (Iris Filter)" (Journal of Academy of Electronics/Information/Communication D-II, vol. J75-D-II No. 3, pp663 to 670, March 1992) and "Extraction of Micro Calcification Shadow by a Morphology Filter using multiple Structural Elements" (Journal of Academy of Electronics/Information/Communication D-II, vol. J75-D-II No. 7, pp1170 to 1176, July 1992).

In the abnormal shadow detection processing, the digital image signal is analyzed by a computer to automatically detect a prospective abnormal shadow which is conceivable to represent a growth, a micro calcification or the like. The detected prospective abnormal shadow is marked to call the attention of the reader. Alternatively, the probability that the prospective abnormal shadow represents a genuine abnormality or the feature value or the index on the basis of which a part of an image is determined to be a prospective abnormal shadow is output, whereby a certain detecting level can be ensured irrespective of the skillfulness of the reader, and overlooking or misreading can be suppressed.

We, this applicant, have proposed a prospective abnormal shadow detecting system, for instance, in U.S. Pat. No. 5,761,334 and Japanese Patent Application 2000-038298, in which a prospective abnormal shadow indicating existence of, for instance, mammary cancer is automatically detected by the use of an iris filter or a morphology filter on the basis of a mammogram or a breast radiation image and the prospective abnormal shadow part of the image is enhanced or enlarged. Then the processed (e.g., enhanced or enlarged) prospective abnormal shadow part is displayed over the overall image or the probability that the prospective abnormal shadow represents a genuine abnormality and/or the feature value or the index on the basis of which the part of the image is determined to be a prospective abnormal shadow is displayed in addition to the overall image.

When the iris filter is used, the density gradients (or the brightness gradients) in the image are represented by gradient vectors and a part of the image where the degree of convergence of density (signal value) gradient vectors is high is determined to be a prospective abnormal shadow, whereby a prospective shadow of growth inherent to the breast cancer can be automatically detected. In the processing using the morphology filter, apart which fluctuates in density in a space narrower than multiple structural elements selected according to the size of the abnormal shadow to be detected is determined to be a prospective abnormal shadow, whereby a prospective shadow of micro calcification inherent to breast cancer can be automatically detected.

We, this applicant, have further proposed improving accuracy of the prospective abnormal shadow detection processing by detecting the prospective abnormal shadow using an evaluation function value such as a Mahalanobis distance as disclosed, for instance, in U.S. Pat. No. 5,732,121.

However, though outputting a prospective abnormal shadow portion such as a prospective growth shadow and a prospective micro calcification shadow, the previously proposed abnormal shadow detection techniques do not output information on whether the abnormality represented by the prospective abnormal shadow is malignant or benignant.

For example, if only the prospective abnormal shadow detection processing using the iris filter or the morphology filter or additional processing for improving the accuracy is carried out, the prospective abnormal shadows representing the malignant and benignant abnormalities are both enhanced.

This can deteriorate the diagnostic efficiency since prospective abnormal shadows representing unmalignant abnormalities are output together with those representing malignant abnormalities.

When prospective abnormal shadows are detected by the use of the iris filter or the morphology filter, prospective abnormal shadows which are conceivable to be malignant are separated from those which are conceivable to be benignant (will be respectively referred to as "malignant prospective abnormal shadow" and "benignant prospective abnormal shadow", hereinbelow) on the basis of a morphological feature, and only malignant prospective abnormal shadows are detected as final prospective abnormal shadows as disclosed in U.S. Pat. No. 5,761,334, Japanese Patent Application No. 2000-038298, and "Distinguishment between benignant and malignant micro calcification clusters in a breast X-ray image"; papers of medical image engineering academy "JAMIT Frontier '99 pp. 89 to 93, only malignant prospective abnormal shadow is output as an image and benignant prospective abnormal shadow is not output as an image. However, since a benignant abnormality can change to a malignant abnormality, it is not preferred that only malignant prospective abnormal shadow be output as an image but it is rather preferred that a suggestion to the effect that the part corresponding to the benignant prospective abnormal shadow is to be kept watched be output together with the image of the malignant prospective abnormal shadow.

That is, none of the conventional systems outputs information sufficiently effective to diagnosis as a result of the automatic detection of the prospective abnormal shadow. That is, in order to enhance effectiveness of the result of the automatic detection of the prospective abnormal shadow as information for assisting the reader in reading the radiation image, it is preferred that information on whether the prospective abnormal shadow is malignant or benignant be output.

SUMMARY OF THE INVENTION

In view of the foregoing observations and description, the primary object of the present invention is to provide a prospective abnormal shadow detecting system which detects a prospective abnormal shadow in a radiation image and outputs information on the prospective abnormal shadow in a manner in which whether the prospective abnormal shadow is malignant or benignant can be distinguished, thereby enhancing effectiveness of the result of the automatic detection of the prospective abnormal shadow as information for assisting the reader in reading the radiation image.

Another object of the present invention is to provide an improved method of and an improved apparatus for judging whether a prospective abnormal shadow is malignant or benignant.

In accordance with a first aspect of the present, there is provided a prospective abnormal shadow detecting system comprising a prospective abnormal shadow detecting means which detects a prospective abnormal shadow in an image on the basis of image data representing the image and a prospective abnormal shadow information output means which outputs information on the prospective abnormal shadow detected by the prospective abnormal shadow detecting means, wherein the improvement comprises that a malignancy judging means which judges whether the prospective abnormal shadow detected by the prospective abnormal shadow detecting means is malignant or benignant is provided and the prospective abnormal shadow information output means outputs the information on the prospective abnormal shadow in such a manner that whether the prospective abnormal shadow is malignant or benignant as judged by the malignancy judging means can be distinguished.

The information on the prospective abnormal shadow may be an image representing the prospective abnormal shadow (may have been subjected to image processing such as contraction, enlargement, frequency-enhancement processing or sharpness-enhancement processing) or values representing the position, shape and/or size of the prospective abnormal shadow. It is preferred that the prospective abnormal shadow information (the information on the prospective abnormal shadow) bears thereon the position of the prospective abnormal shadow in the overall image. It is suitable to output a malignant prospective abnormal shadow and a benignant prospective abnormal shadow in sequence in a predetermined order.

As the information bearing thereon the position of the prospective abnormal shadow, a marker such as an arrow pointing the prospective abnormal shadow in the overall image or a rectangular, a circular ROI frame circumscribing the prospective abnormal shadow, or a line extending along the edge of the prospective abnormal shadow may be used. The malignant prospective abnormal shadow and the benignant prospective abnormal shadow may be marked with a marker, ROI frame or the like which are different in color and/or shape. With this arrangement, malignant and benignant prospective abnormal shadows can be distinguished from each other even they are output simultaneously.

It is preferred that the prospective abnormal shadow information output means outputs an index of the malignancy and/or an index of the benignancy of the prospective abnormal shadow.

Though it is preferred that the index be output near the image of the prospective abnormal shadow, the marker, ROI frame or the like simultaneously therewith, the index may be separately output from the image of the prospective abnormal shadow, the marker, ROI frame or the like.

The index of the malignancy and/or the benignancy of the prospective abnormal shadow need not directly indicate the malignancy and/or the benignancy of the prospective abnormal shadow but may be any index so long as it can directly or indirectly indicate the malignancy and/or the benignancy of the prospective abnormal shadow. For example, the feature value of image information such as the degree of convergence of the growth shadows, the output value of the iris filter or the morphology filter, and the density of the calcification, the threshold value on the basis of which the prospective abnormal shadow detecting means detects a prospective abnormal shadow, or the "confidence of detection of the prospective abnormal shadow" may be employed as the index of the malignancy and/or the benignancy of the prospective abnormal shadow.

The "confidence of detection of the prospective abnormal shadow" is, for instance, the margin by which the feature value of the part which has been determined to be a prospective abnormal shadow exceeds the threshold value in the case where the prospective abnormal shadow detecting means determines a part to be a prospective abnormal shadow when the feature value of the part exceeds a predetermined threshold value.

With the prospective abnormal shadow detecting system of this invention, the reader or the doctor can know to some extent which of the prospective abnormal shadows is malignant and accordingly, the diagnostic efficiency can be improved.

Further, output of an index of the malignancy and/or the benignancy of the prospective abnormal shadow greatly assists the reader or the doctor in reading the radiation image.

In a preferred embodiment of the present invention, the malignancy judging means judges whether the prospective abnormal shadow detected by the prospective abnormal shadow detecting means is malignant or benignant by obtaining a benignancy evaluation function value which is a value of an evaluation function for benignancy, a malignancy evaluation function value which is a value of an evaluation function for malignancy, and a normalcy evaluation function value which is a value of an evaluation function for normalcy by defining feature values of the image data by a predetermined function, and comparing the normalcy evaluation function value with the benignancy evaluation function value and the normalcy evaluation function value with the malignancy evaluation function value.

The predetermined function may be any function so long as it depends upon benignancy or malignancy of the prospective abnormal shadow. For example, when at least two (n in number) of lots of feature values obtained in the prospective abnormal shadow detecting processing are plotted on n-dimensional feature axes (x1, x2, x3, . . . , xn) to express the prospective abnormal shadow in an n-dimensional pattern space, and a function representing a concept of distance taking into account spread of shadow patterns is employed as the predetermined function in the n-dimensional pattern space, whether the shadow is malignant or benignant can be known. As the function representing a concept of distance, a Mahalanobis distance, a city block distance, a chess-board distance, a Minkowski distance or the like may be employed.

Whether the shadow is benignant or malignant may be judged in any manner so long as the malignancy and benignancy are distinguished from each other on the basis of comparison of the evaluation function values. For example, the prospective abnormal shadows may be divided only into malignancy and benignancy or may be divided into normalcy, malignancy and benignancy.

For example, first and second likelihood ratios LR1 and LR2 which are respectively defined to be LR1=normalcy evaluation function/malignancy evaluation function and LR2=normalcy evaluation function/benignancy evaluation function are first obtained. Then it is determined that the prospective abnormal shadow is malignant when the first likelihood ratio LR1>the second likelihood ratio LR2 and at the same time, the first likelihood ratio LR1>a first threshold value, and that prospective abnormal shadow is benignant when the first likelihood ratio LR1<the second likelihood ratio LR2 and at the same time, the second likelihood ratio LR2>a second threshold value, and otherwise it determined that the prospective abnormal shadow is a shadow of a normal part.

Further it may be determined that that the prospective abnormal shadow is malignant when the first likelihood ratio LR1>the second likelihood ratio LR2 and at the same time, the first likelihood ratio LR1>a first threshold value while it is otherwise determined that the prospective abnormal shadow is benignant.

It is preferred that the Mahalanobis distance from a normal tissue distribution be employed as the normalcy evaluation function value, the Mahalanobis distance from a benignant tissue distribution be employed as the benignancy evaluation function value, and the Mahalanobis distance from a malignant tissue distribution be employed as the malignancy evaluation function value.

In this case, the first likelihood ratio LR1 is the Mahalanobis distance from a normal tissue distribution/the Mahalanobis distance from a malignant tissue distribution, and the second likelihood ratio LR2 is the Mahalanobis distance from a normal tissue distribution/the Mahalanobis distance from a benignant tissue distribution.

BRIEF DESCRIPTION OF THE DRAWINGS

FIG. 4 is a view showing a mask for calculating gradient vectors in the iris filter processing, FIG. 10 is a schematic view showing a simultaneous matrix, FIG. 12A is a view showing a frame displayed by the prospective abnormal shadow detecting system, and FIG. 12B is a view showing a part of the frame in FIG. 12A in an enlarged scale.

DESCRIPTION OF THE PREFERRED EMBODIMENT

Figure 1:
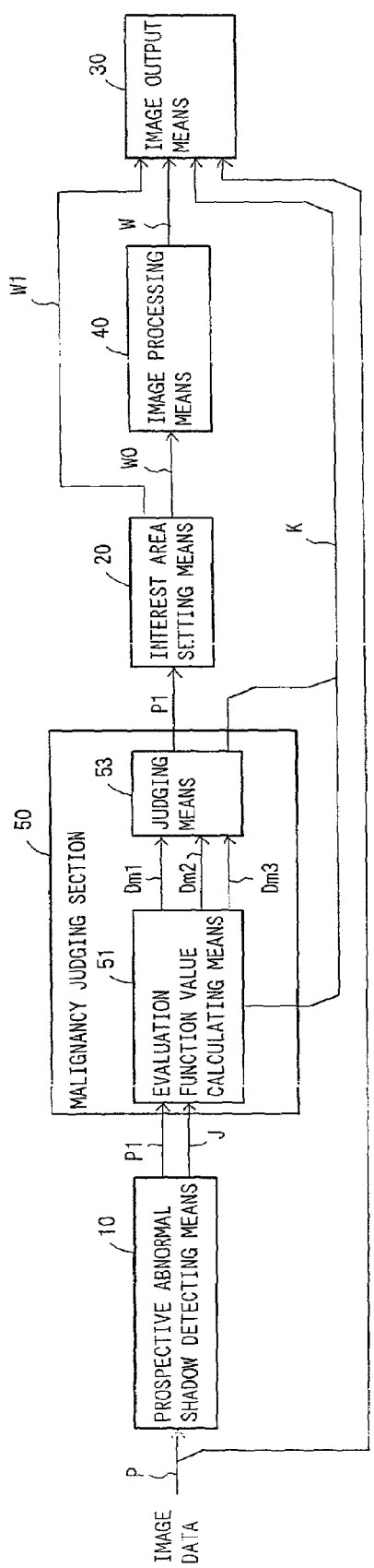
FIG. 1 is a schematic block diagram showing a prospective abnormal shadow detecting system in accordance with an embodiment of the present invention.

In FIG. 1, a prospective abnormal shadow detecting system 1 in accordance with an embodiment of the present invention receives a mammogram P of a patient and outputs image information and the like to an image output means 30, which may be, for instance, a CRT or a liquid crystal panel. The prospective abnormal shadow detecting system 1 comprises a prospective abnormal shadow detecting means 10 which detects a prospective abnormal shadow P1 in "the overall image" (the mammogram) P on the basis of image data P (also the image data on the mammogram P is sometimes indicated at P), a malignancy judging section 50 which judges whether the prospective abnormal shadow P1 detected by the prospective abnormal shadow detecting means 10 is malignant or benignant on the basis of a predetermined feature value, an interest area setting means 20 which sets a square area circumscribing the prospective abnormal shadow P1 as an interest area, an image processing means 40 which carries out enlargement/contraction processing and/or frequency enhancement processing on the image W0 of the interest area to obtain a processed interest area image W, and an image output means 30 which displays, together with the overall image P, the processed interest area image W as information on the prospective abnormal shadow P1 detected by the prospective abnormal shadow detecting means 1 and indexes K representing, for instance, a threshold value on the basis of which the prospective abnormal shadow detecting means 1 determines whether a part of the overall image P bears a prospective abnormal shadow.

The image output means 30 outputs the information on the prospective abnormal shadow P1 so that whether the prospective abnormal shadow P1 is malignant or benignant is distinguishable.

The prospective abnormal shadow detecting means 10 stores both an algorism for detecting a prospective growth shadow by the use of an iris filter and an algorism for detecting a prospective calcification shadow by the use of a morphology filter, and detects the shape, position, size and number of the prospective abnormal shadows detected by the respective algorisms. In the algorism for detecting a prospective growth shadow by the use of an iris filter, parts where the degree of convergence of density gradients is higher are taken as prospective growth shadows and in the algorism for detecting a prospective calcification shadow by the use of a morphology filter, parts where density fluctuates in a space narrower than multiple structural elements are taken as prospective calcification shadow. The prospective abnormal shadows detected by the respective algorisms are different in nature, that is, the former being a prospective growth shadow and the former being a prospective calcification shadow.

Further, the prospective abnormal shadow detecting means 1 outputs, to the image output means 30, the threshold value of the degree of convergence of density gradients and the output I of the iris filter on the basis of which the prospective abnormal shadow detecting means 1 determines whether the part is a prospective growth shadow, feature values such as the density of calcification of the part on the basis of which the prospective abnormal shadow detecting means 10 determines whether the part is a prospective calcification shadow, indexes derived from the feature values and the "confidence of detection of the prospective abnormal shadow", e.g., the amount by which the feature value of the part which has been determined to be a prospective abnormal shadow exceeds the threshold value.

The malignancy judging section 50 determines the value of index of the malignancy or the benignancy of the prospective abnormal shadow (the prospective growth shadow or the prospective calcification shadow) and outputs it to the image output means 30.

As shown in FIG. 1, the malignancy judging section 50 comprises an evaluation function value calculating means 51 which defines a feature value of the image information by a predetermined weight function and calculates a value of a benignancy evaluation function representing the benignancy, a value of a malignancy evaluation function representing the malignancy and a value of a normalcy evaluation function representing the normalcy. The malignancy judging section 50 further comprises a judging means 53 which judges whether the prospective abnormal shadow is malignant or benignant by comparing the value of the normalcy evaluation function with the value of the benignancy evaluation function and the value of the normalcy evaluation function with the value of the malignancy evaluation function.

Specifically, the evaluation function value calculating means 51 calculates the Mahalanobis distance from a normal tissue distribution as the value of the normalcy evaluation function, the Mahalanobis distance from a benignant tissue distribution as the value of the benignancy evaluation function, and the Mahalanobis distance from a malignant tissue distribution as the value of the malignancy evaluation function.

The judging means 53 calculates a first likelihood ratio (=the value of the normalcy evaluation function/the value of the malignancy evaluation function) and a second likelihood ratio (=the value of the normalcy evaluation function/the value of the benignancy evaluation function), and judges whether the prospective abnormal shadow is malignant or benignant through comparison of the first and second likelihood ratios with a predetermined threshold value.

Operation of the prospective abnormal shadow detecting system 1 of this embodiment will be described hereinbelow.

The overall image information P of a mammogram is input into the prospective abnormal shadow detecting means 1 from an external image forming modality (e.g., CT or CR). The prospective abnormal shadow detecting means 1 carries out prospective abnormal shadow detecting processing on the overall image information P according to an algorism for detecting a prospective growth shadow by the use of an iris filter and an algorism for detecting a prospective calcification shadow by the use of a morphology filter.

Detection of a prospective growth shadow by the use of an iris filter (the iris filter processing) and the malignancy judging processing (judgment whether the prospective growth shadow detected by the iris filter processing is malignant or benignant) will be described hereinbelow.

In this particular embodiment, image data is a high density, high level signal which is used, for instance, when a radiation image is recorded on a photographic film and in which as the value of density increases, the level of the signal becomes higher.

Figure 2:
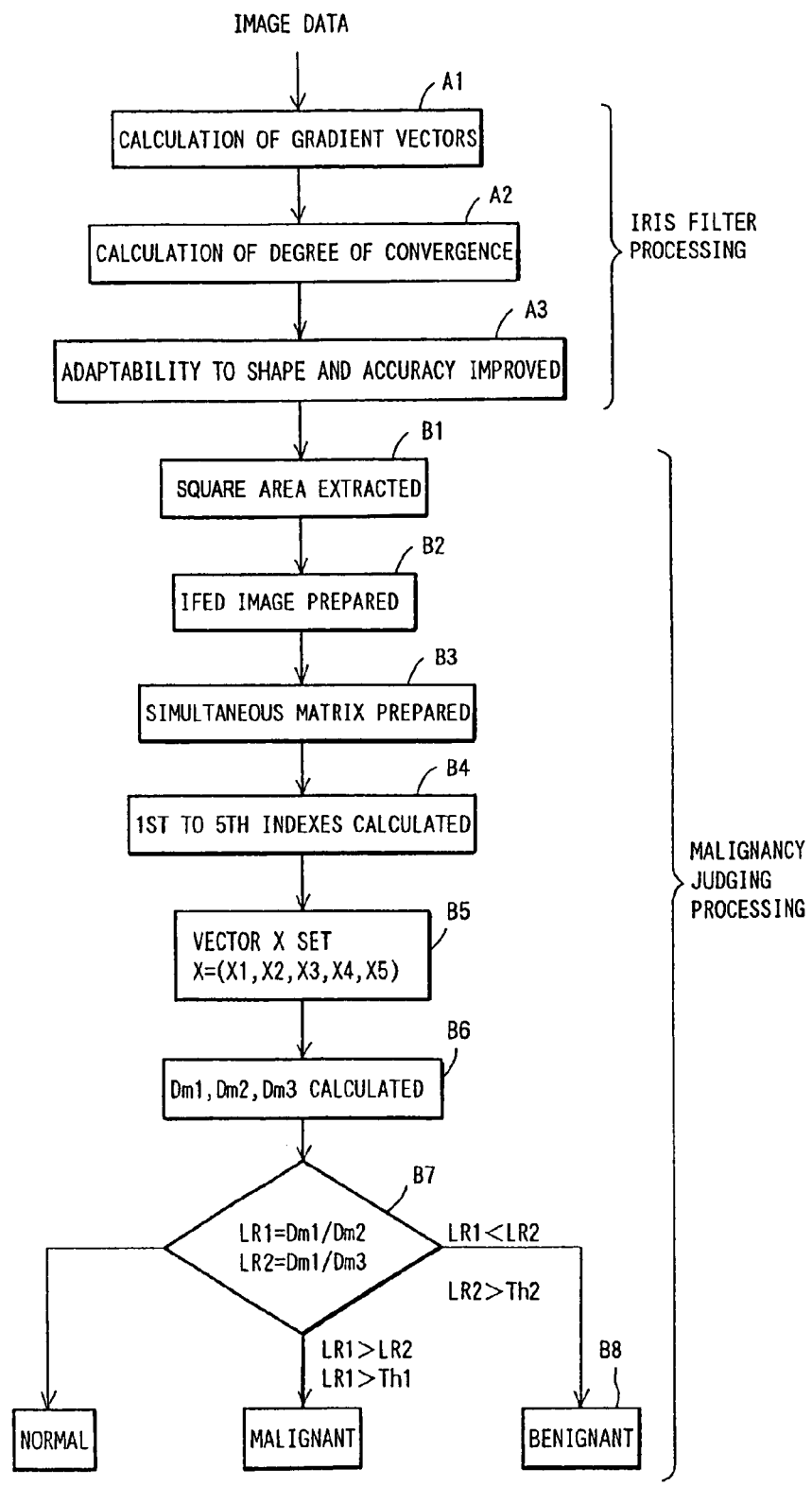
FIG. 2 is a flow chart for illustrating the prospective abnormal shadow detecting processing and the malignancy judging processing to be executed by the prospective abnormal shadow detecting system.

FIG. 2 shows a flow chart for illustrating a specific procedure of the iris filter processing and the malignancy judging processing.

Figure 3A:
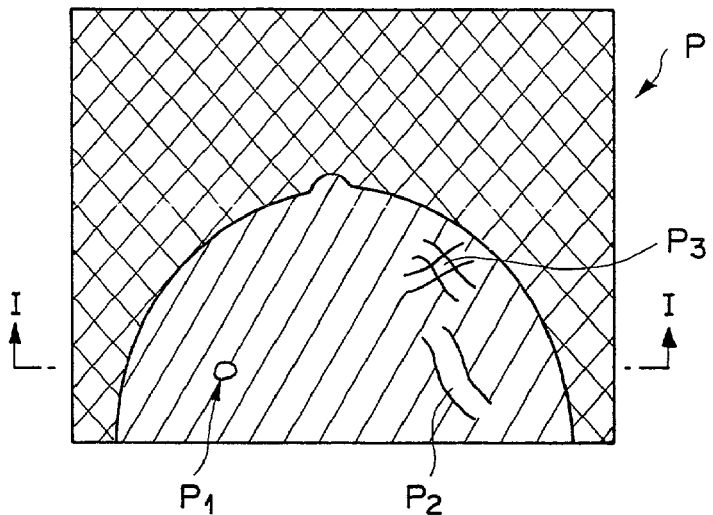
FIG. 3A is an example of a mammogram to which the present invention is applied.

The iris filter processing is carried out on densities S of the image data representing a radiation image of the breast P (FIG. 3A) input from the external modality to detect a prospective growth (e.g., breast cancer) shadow P1.

Iris Filter Processing (Step A1 in FIG. 2): Calculation of the Gradient Vectors

Calculation represented by the following formula (1) is effected for each of the pixels j of the radiation image and the orientation θ of the density gradient vector of image data S is obtained.

$$\theta = \tan^{-1}\frac{(f_3 + f_4 + f_5 + f_6 + f_7) - (f_{11} + f_{12} + f_{13} + f_{14} + f_{15})}{(f_1 + f_2 + f_3 + f_{15} + f_{16}) - (f_7 + f_8 + f_9 + f_{10} + f_{11})} \quad (1)$$

wherein $f_1$ to $f_{16}$ are, as shown in FIG. 4, values (image data) of pixels on the outer periphery of a 5×5 pixel mask about a given pixel j (pixel of current interest). Needless to say, the size of the mask need not be limited to 5×5.

(Step A2): Calculation of the Degree of Convergence of the Gradient Vectors

Figure 5:
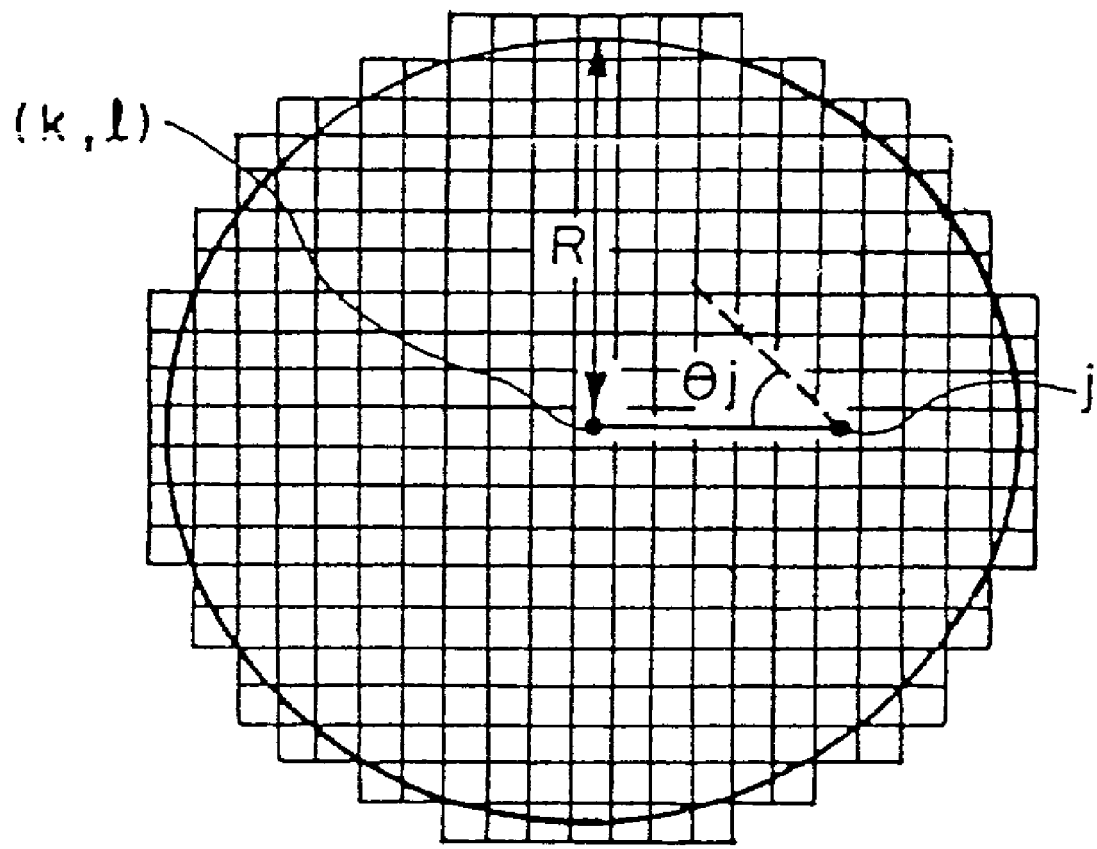
FIG. 5 is a view for illustrating the degree of convergence of gradient vectors for the pixel of current interest.

After the orientations θ of the density gradient vector for all the pixels are calculated, a pixel onto which the orientations θ of the density gradient vector are converged is detected. That is, the degree of convergence C of the gradient vectors onto each of the pixels j of the image is calculated according to the following formula (2).

$$C = (1/N)\sum_{j=1}^{N}\cos\theta_j \quad (2)$$

wherein N represents the number of pixels in a circle with its center at a pixel of current interest and with a radius of R and $\theta_j$ represents the angle between the straight line connecting the pixel of current interest and each of the pixels j in the circle and the gradient vector for the pixel j as calculated according to the aforesaid formula (1) as shown in FIG. 5. Accordingly, the degree of convergence C as calculated according the aforesaid formula (2) becomes high when many of the orientations $\theta_j$ of the gradient vectors for the pixels j are directed toward the pixel of current interest.

Figure 3B:
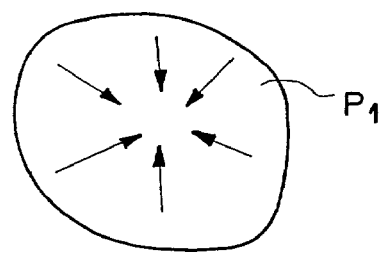
FIGS. 3B to 3D are views for illustrating the degree of convergence of density gradient vectors in the mammogram.
Figure 3C:
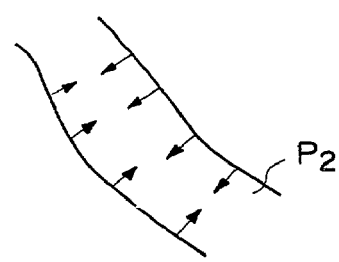

It has been known that in a negative radiation image, a growth shadow is generally lower in density (higher in brightness) at a central portion thereof than surroundings, and the density distribution in the growth shadow is such that the density is lower at the central portion and is gradually increased toward the periphery thereof. Accordingly, taking into account the degree of convergence C of the gradient vectors, growth shadows P1 (FIG. 3B) can be distinguished from shadows P2 of blood vessels or mammary glands (FIG. 3C).

Figure 6:
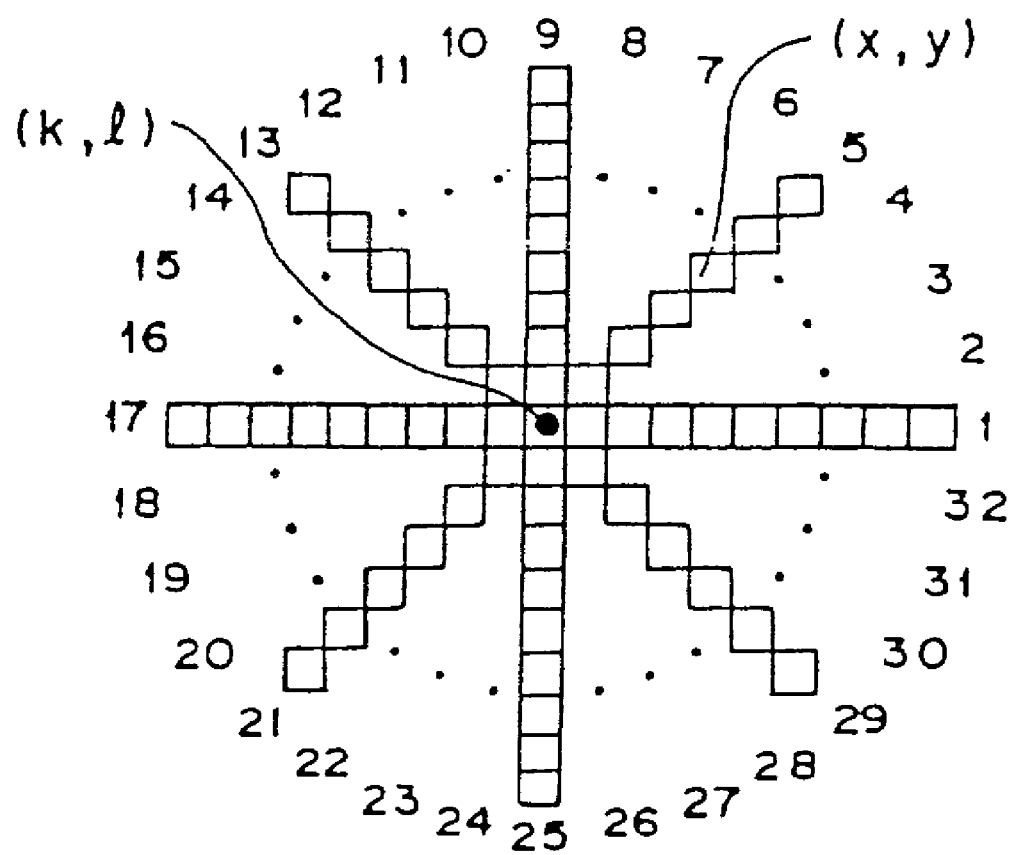
FIG. 6 is a view for illustrating an iris filter whose size and shape are changed to conform to the size and shape of the growth.

(Step A2): Processing of Improving Adaptability to Shape and Detecting Accuracy of the Filter The size and shape of the filter are changed to conform to the size and shape of the growth so that growth can be detected without affected by the size and shape of the growth. FIG. 6 shows an example of such a filter. In the filter shown in FIG. 6, the degree of convergence C is evaluated on the basis of only pixels on radial lines extending from the pixel of current interest in M directions at regular intervals of $2\pi/M$ (in the example shown in FIG. 6, in 32 directions at regular intervals of 11.25°).

The coordinates ([x], [y]) of a pixel which is in an i-th direction (on an i-th radial line) and an n-th pixel as numbered from the pixel of current interest are given by the following formulae (3) and (4) wherein (k, l) are the coordinates of the pixel of current interest, and [x] and [y] are maximum integers which are not larger than x and y, respectively.

$$x = k + n \cos\{2\pi(i-1)/M\} \quad (3)$$

$$x = l + n \sin\{2\pi(i-1)/M\} \quad (4)$$

The value of outputs of the pixels from the pixel of current interest to the pixel at which the degree of convergence C is maximized on each of the 32 directions is taken as the degree of convergence $C_{imax}$ in the direction, and the degrees of convergence $C_{imax}$ in all the directions are averaged. The average of the degrees of convergence $C_{imax}$ in all the directions thus obtained is taken as the degree of convergence C of the gradient vectors for the pixel of current interest.

Specifically, the degrees of convergence $C_{i(n)}$ are calculated for pixels in the range of from a pixel of current interest to a pixel which is in an i-th direction (on an i-th radial line) and an n-th pixel as numbered from the pixel of current interest is calculated according to the following formula (5).

$$C_{i(n)} = \sum_{i=1}^{n}\{(\cos\theta_{il})/n\}, R_{\min} \le n \le R_{\max} \quad (5)$$

That is, formula (5) is for calculating the degrees of convergence $C_{i(n)}$ for the pixels in the range of from the pixel of current interest to a pixel which is between the $R_{min}$-th pixel and the $R_{max}$-th pixel as numbered from the pixel of current interest on each radial line, the values of $R_{min}$ and $R_{max}$ respectively corresponding to a minimum radius and a maximum radius of a growth shadow to be extracted.

Then the degrees of convergence C of the gradient vectors are calculated according to the following formulae (6) and (7).

$$C_{imax} = \max Ci(n) \quad (6)$$

$$R_{min} \le n \le R_{max}$$

$$C = (1/32)\sum_{i=1}^{32} C_{i\max} \quad (7)$$

Since the $C_{imax}$ obtained from formula (6) is the maximum value of the degrees of convergence $C_{i(n)}$ in each direction obtained according to formula (5), the area between the pixel of current interest and the pixel at which the degree of convergence $C_{i(n)}$ is maximized is a prospective growth shadow area in the direction.

By obtaining prospective growth shadow areas in all the directions according to formula (6) and connecting the prospective growth shadow areas in adjacent directions by a linear line or non-linear line, the outer shape of the overall prospective growth shadow area can be determined.

In formula (7), the maximum values $C_{imax}$ of the degrees of convergence $C_{i(n)}$ for the respective directions are averaged. By comparing the average of the maximum values $C_{imax}$ of the degrees of convergence $C_{i(n)}$ with a threshold value T, whether the area having its center at the pixel of current interest is a prospective growth shadow (a prospective abnormal shadow) is determined.

Since the area over which the degrees of convergence C of the gradient vectors varies in its size and shape according to the gradient vector distribution in a similar manner to that in which the human iris is enlarged and contracted according to the ambient brightness, the method of detecting a prospective growth shadow using the degree of convergence of gradient vectors is called "iris filter processing".

The degree of convergence $C_{i(n)}$ may be calculated according to the following formula (5') in place of the aforesaid formula (5).

$$C_{i(n)} = \frac{1}{n - R_{\min}+1} \sum_{i=R_{\min}}^{n} \cos\theta_{il}, R_{\min} \le n \le R_{\max} \quad (5')$$

That is, formula (5') is for calculating the degrees of convergence $C_{i(n)}$ for the pixels in the range of from the $R_{min}$-th pixel to a pixel which is between the $R_{min}$-th pixel and the $R_{max}$-th pixel as numbered from the pixel of current interest on each radial line, the values of $R_{min}$ and $R_{max}$ respectively corresponding to a minimum radius and a maximum radius of a growth shadow to be extracted.

Malignancy Judging Processing

Figure 3D:
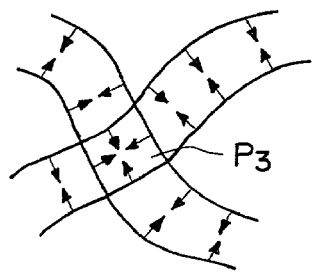

According to the iris filter processing, growth shadows of a desired size can be basically effectively extracted. However, for instance, a part P3 where two blood vessels intersect each other as shown in FIG. 3D, the degree C of convergence also takes a large value, which makes it difficult to clearly separate the growth shadow P1 from such a part P3 (will be referred to as "pseudo-abnormal-shadow", hereinbelow).

Further, even if prospective abnormal shadows can be separated from normal shadows, whether the prospective abnormal shadows are malignant or benignant cannot be judged by the iris filter processing. This is the case also with detection of calcification by the morphology filter.

In this particular embodiment, the malignancy judging section 50 determines whether the prospective abnormal shadow as detected by the prospective abnormal shadow detecting means 1 is malignant or benignant by the use of the a Mahalanobis distance in the manner shown in steps B1 to B8 in FIG. 2. (step B1)

In step B1, square areas including the respective prospective abnormal shadows detected by the iris filter processing (can include a pseudo-abnormal-shadow) and their vicinities are extracted.

In step B2, an edge image is prepared for each of the extracted square area in the following manner.

A point at which the degrees of convergence $C_{i(n)}$ is maximized on each radial line is obtained over the entire length thereof. Though, in the aforesaid formulae (5) or (5') and (6), the value on $\underline{n}$ is limited in the range from $R_{min}$ to $R_{max}$, the point at which the degrees of convergence $C_{i(n)}$ is maximized is obtained over the entire length thereof without the value of $\underline{n}$ limited in the range from $R_{min}$ to $R_{max}$ in this step.

Figure 7:
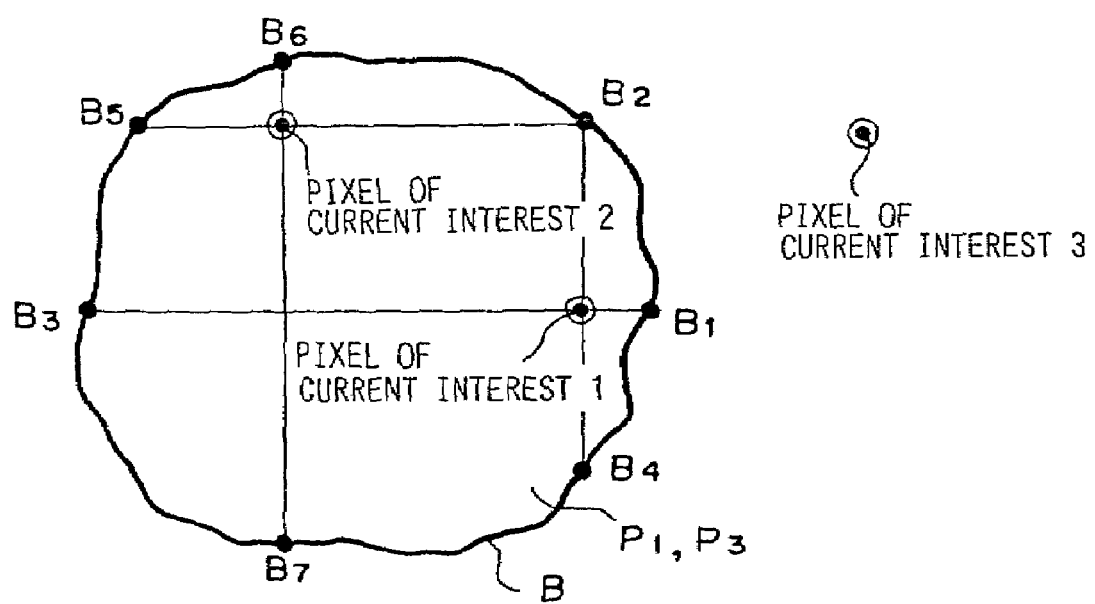
FIG. 7 is a view for illustrating formation of the IFED image.

As a result, when the pixel of current interest is inside the prospective abnormal shadow (P1 or P3), the value of $\underline{n}$ which gives the point at which the degrees of convergence $C_{i(n)}$ is maximized on the i-th radial line indicates the pixel (s) at which the i-th line intersects the edge of the prospective abnormal shadow B (FIG. 7). For example, for a pixel of current interest 1, the value of $\underline{n}$ indicates pixels B1, B2, B3 and B4, and for a pixel of current interest 2, the value of $\underline{n}$ indicates pixels B2, B5, B6 and B7.

To the contrast, when the pixel of current interest is outside the prospective abnormal shadow (P1 or P3), the value of $\underline{n}$ which gives the point at which the degrees of convergence $C_{i(n)}$ is maximized on the i-th radial line indicates the pixel of current interest itself (e.g., pixel of current interest 3 in FIG. 7).

With all the pixels in the extracted area taken as the pixel of current interest in sequence, the frequency at which each pixel becomes the point of maximum convergence (the point at which the degrees of convergence $C_{i(n)}$ is maximized) is counted.

Figure 8:
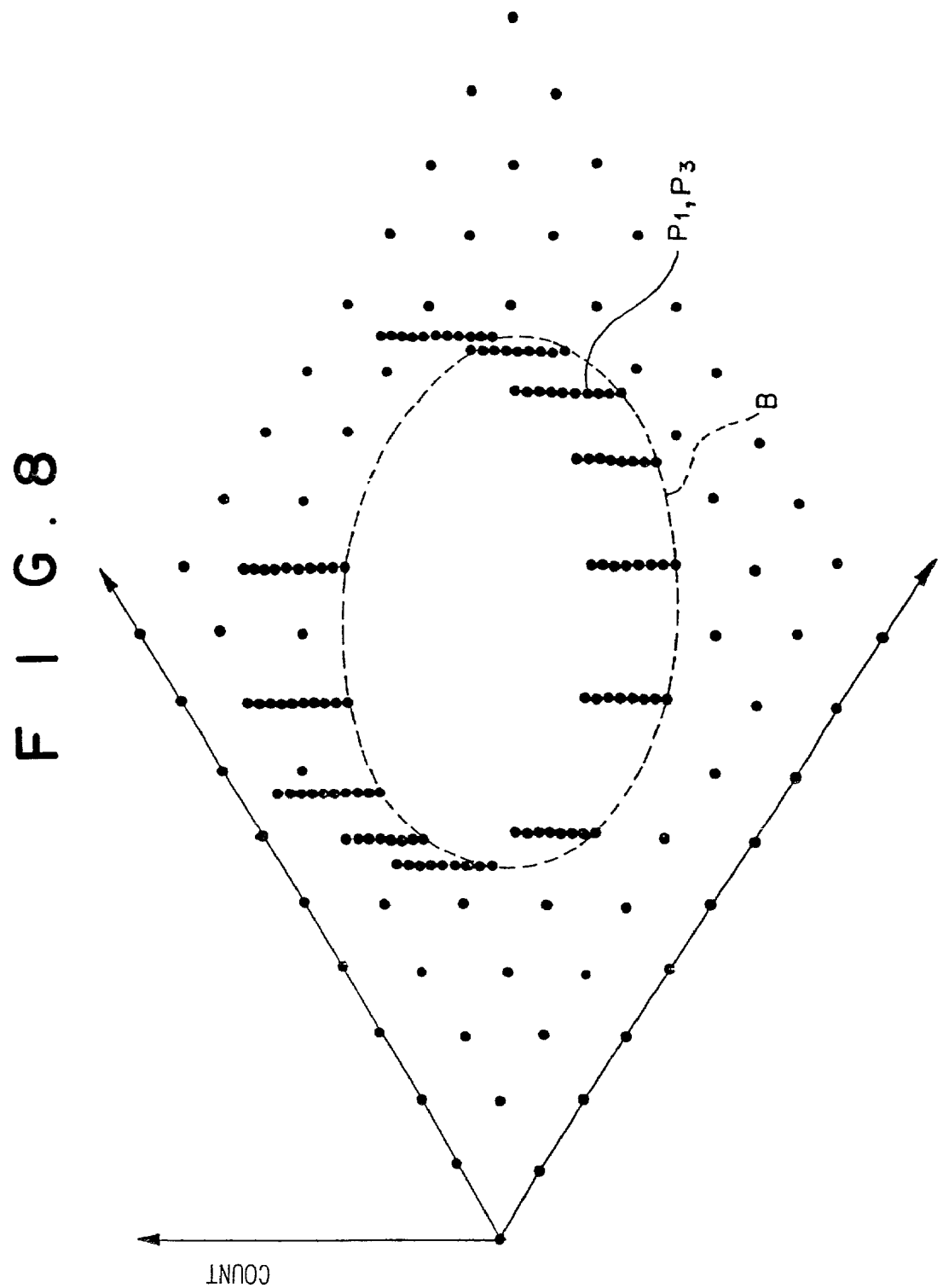
FIG. 8 is a schematic view showing an IFED image.

The counts for the pixels outside the prospective abnormal shadow are all "1", the counts for the pixels inside the prospective abnormal shadow are all "0" and the counts for the pixels on the edge of the prospective abnormal shadow are all larger than 1 as shown in FIG. 8. The image representing the values of the count for the pixels in the extracted area is defined to be an IFED (Iris Filter Edge) image.

In step B3, the IFED image is processed in the following manner.

Figure 9:
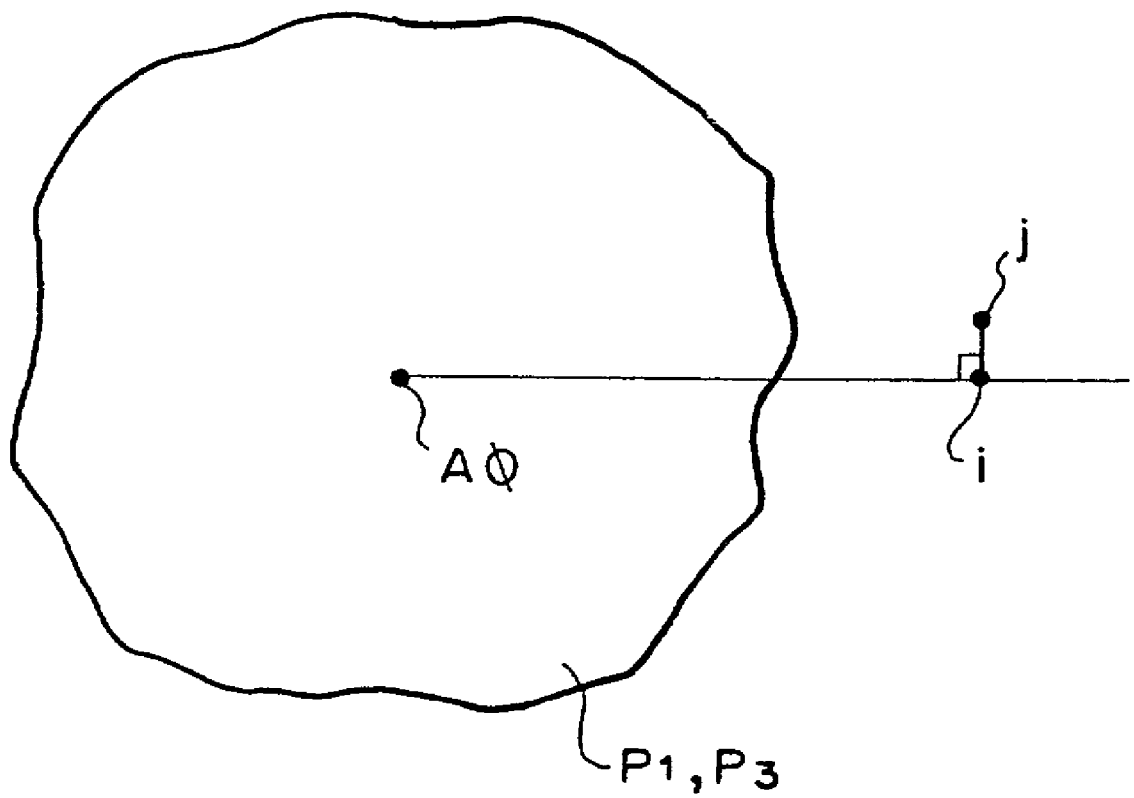
FIG. 9 is a view for illustrating formation of the simultaneous matrix on the basis of the IFED image.

As shown in FIG. 9, the center of gravity AO of the prospective abnormal shadow (P1 or P3) is obtained and a radial line is extended from the center of gravity AO. Then a given point on the radial line is taken as point $\underline{i}$ and a point which is on a line perpendicular to the radial line and is at a distance of two pixels from the point $\underline{i}$ is taken as point $\underline{j}$.

Figure 10:
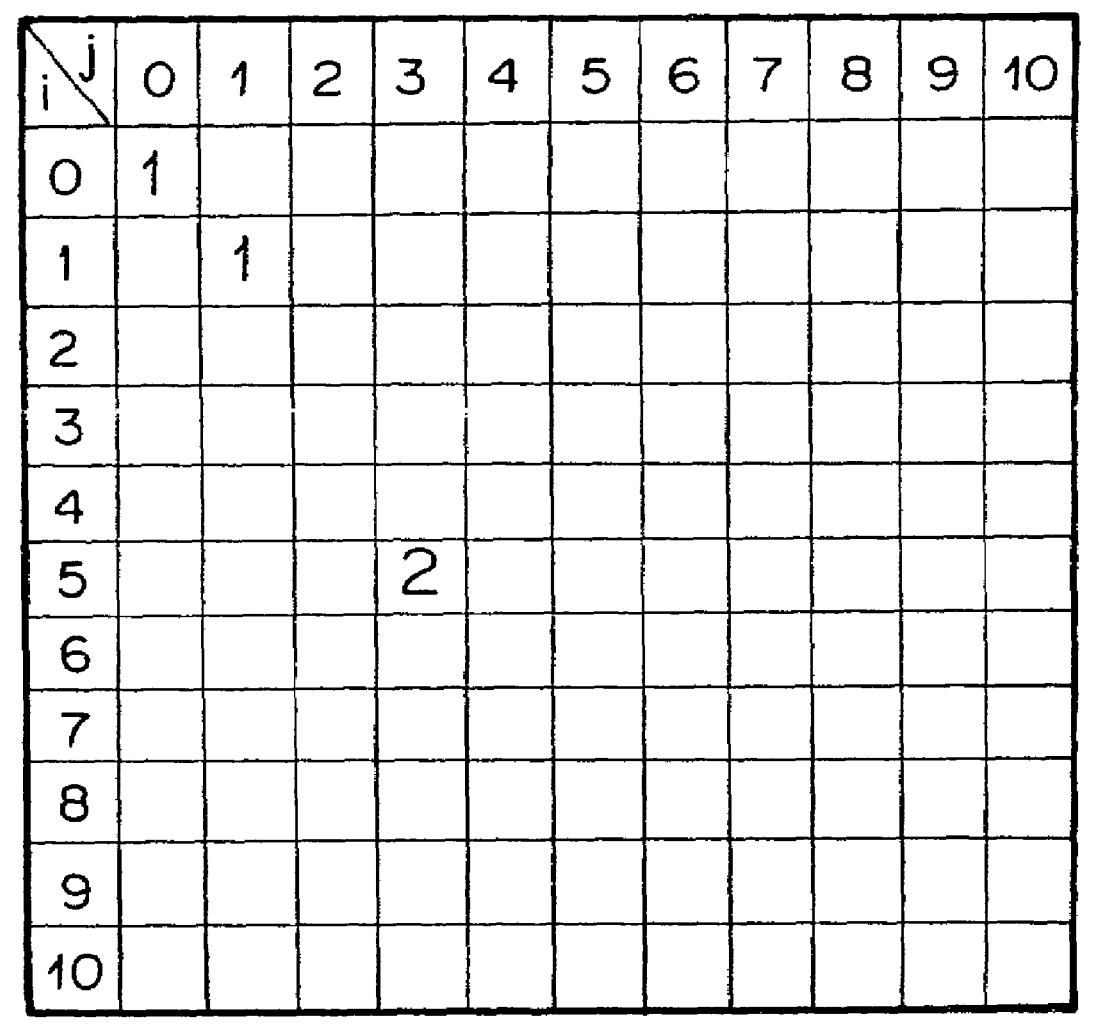

The frequency at which the relation between the counts for pixel $\underline{i}$ and pixel $\underline{j}$ becomes a certain relation (e.g., [i=0, j=0], [i=1, j=0], [i=1, j=1] . . . ) is counted up in a matrix such as shown in FIG. 10. For example, when the count for pixel $\underline{i}$ is 1 and the count for pixel $\underline{j}$ is 1, that is, both pixels $\underline{i}$ and $\underline{j}$ are outside the prospective abnormal shadow P1 or P3, 1 is written in the cell (1, 1) where i=1 and j=1. When the count for pixel $\underline{i}$ is 0 and the count for pixel $\underline{j}$ is 0, that is, both pixels $\underline{i}$ and $\underline{j}$ are inside the prospective abnormal shadow P1 or P3, 1 is written in the cell (0, 0) where i=0 and j=0. When the count for pixel $\underline{i}$ is 5 and the count for pixel $\underline{j}$ is 3, that is, both pixels $\underline{i}$ and $\underline{j}$ are on the edge of the prospective abnormal shadow P1 or P3, 1 is written in the cell (5, 3) where i=5 and j=3.

The radial line is rotated and the pixel $\underline{i}$ is changed so that all the pixels in the IFED image becomes the pixel $\underline{i}$, and the value in each cell is incremented each time the relation between the counts for the pixel $\underline{i}$ and the pixel $\underline{j}$ becomes that represented by the cell. For example, when the relation where the count for pixel $\underline{i}$ is 5 and the count for pixel $\underline{j}$ is 3 appears twice, then the count in the cell (5, 3) is 2. In this manner, the simultaneous matrix shown in FIG. 10 is completed.

Since the growth shadow is generally circular in shape and the points $\underline{i}$ and $\underline{j}$ are very close to each other, when the points i and j are both on the edge of the prospective abnormal shadow, that is, the IFEFD image counts for the pixels $\underline{i}$ and $\underline{j}$ are both larger than 1, there is a strong possibility that the prospective abnormal shadow as detected by the iris filter processing is a real growth shadow P1.

To the contrast, since a pseudo-abnormal-shadow P3 is rarely circular in shape, there is very weak possibility that the points i and j are both on the edge of the prospective abnormal shadow, that is, the IFEFD image counts for the pixels $\underline{i}$ and $\underline{j}$ are both larger than 1, when the prospective abnormal shadow as detected by the iris filter processing is a pseudo-abnormal-shadow P3.

Accordingly, feature values of the simultaneous matrix (x, y) have significant differences between when the prospective abnormal shadow as detected by the iris filter processing is a real growth shadow P1 and when it is merely a pseudo-abnormal-shadow P3. The feature values of the simultaneous matrix are edge information.

In step B4, as the specific terms of the edge information, feature values of the simultaneous matrix, i.e., a first index $\underline{var}$ representing dispersion (the following formula (8)), a second index $\underline{dfe}$ representing difference entropy (the following formula (9)), a third index $\underline{cor}$ representing correlation (the following formula (10)), a fourth index $\underline{idm}$ representing inverse difference moment (the following formula (11)), and a fifth index $\underline{se}$ representing sum entropy (the following formula (12)) are calculated.

$$\text{var} = \sum_i \sum_j \{(i - u_x)^2 \cdot P_g(i, j)\} \qquad (8)$$

$$dfe = \sum_k \{P_{x-y}(k) \cdot \log|P_{x-y}(k)|\} \qquad (9)$$

$$cor = \sum_i \sum_j [\{i \cdot j \cdot P_g(i, j) - u_x \cdot u_y\} / (\sigma_x \cdot \sigma_y)] \qquad (10)$$

$$idm = \sum_i \sum_k [P_g(i, j) / \{1 + (i - j)^2\}] \qquad (11)$$

-continued $$se = -\sum_k [P_{x+y}(k) \cdot \log\{P_{x+y}(k)\}] \quad (12)$$

wherein $$u_x = \sum_i \{i \cdot P_x(i)\}, u_y \sum_j \{j \cdot P_y(j)\},$$

$$P_{x-y}(k) = \sum_i \sum_j P_g(i, j), k = |i - j|,$$

$$P_{x+y}(k) = \sum_i \sum_j P_g(i, j), k = i + j,$$

$$\sigma_x^2 = \sum_i (i - u_x)^2 \cdot P_x(i),$$

$$\sigma_y^2 = \sum_j (i - u_y)^2 \cdot P_y(j),$$

$P_x(i)$ is the projection distribution in $j$ direction, $$P_x(i) = \sum_j P_g(i, j), \text{ and}$$

$P_y(j)$ is the projection distribution in $i$ direction, $$P_y(j) = \sum_i P_g(i, j).$$

The first to third indexes var, dfe and cor take a relatively large value when the prospective abnormal shadow is a real growth shadow P1 and take a relatively small value when the prospective abnormal shadow is a pseudo-abnormal-shadow P3 such as a shadow of a mammary gland or a blood vessel.

The fourth index takes a relatively small value when the prospective abnormal shadow is a real growth shadow P1 and takes a relatively large value when the prospective abnormal shadow is a pseudo-abnormal-shadow P3 such as a shadow of a mammary gland or a blood vessel. The fifth index takes a relatively large value when the prospective abnormal shadow is a real growth shadow P1 and takes a relatively small value when the prospective abnormal shadow is a pseudo-abnormal-shadow P3 such as a shadow of a mammary gland or a blood vessel.

Thereafter, the feature values are defined as an evaluation function by a predetermined weight function and malignancy/benignancy of the prospective abnormal shadow is judged on the basis of the evaluation function.

As disclosed, for instance, in Japanese Unexamined Patent Publication No. 9(1997)-167238, a Mahalanobis distance, a Fisher's discrimination function and the like can be employed as the evaluation function defined by a weight function. In this particular embodiment, the Mahalanobis distance is employed.

In step B5, the values of the five indexes are plotted on different five-dimensional axes (var=x1, dfe=x2, cor=x3, idm=x4 and se=x5) and a vector x consisting of the five-dimensional elements is set.

In step B6, the Mahalanobis distance of the prospective abnormal shadow from a pattern of a normal shadow (the Mahalanobis distance from a normal tissue distribution) Dm1, the Mahalanobis distance from a pattern of a malignant tissue distribution (the Mahalanobis distance from a cancer distribution in an abnormal shadow) Dm2, and the Mahalanobis distance from a pattern of a benignant tissue distribution (the Mahalanobis distance from a benignancy distribution in an abnormal shadow) Dm3 are calculated according to the following formula (13). The steps B1 to B6 are executed by the evaluation function value calculating means 51.

$$Dmi = \left(\vec{x} - \vec{mi}\right) \sum_i^{-1} \left(\vec{x} - \vec{mi}\right) \quad (13)$$

wherein $\Sigma_i$ represents a covariance matrix of a pattern class wi (of normal shadows where i=1, of malignant shadows where i=2 and of benignant shadows where i=3), that is, $$\sum_i = (1/Ni) \sum_{x \in wi} \left(\vec{x} - \vec{mi}\right)\left(\vec{x} - \overleftarrow{mi}\right)$$

wherein t represents a transposed vector (a transverse vector), $$\vec{x}$$

represents a feature value x in vector (that is, $$\vec{x} = (x1, x2, \cdots, xN),$$

$\Sigma_i^{-1}$ represents an inverse matrix of $\Sigma_i$, and $$\vec{mi}$$

represents the average of the pattern class wi $$\left(\text{that is, } \vec{mi} = (1/Ni) \sum_{x \in wi} \vec{x}\right).$$

The pattern classes of normal shadows, malignant shadows and benignant shadows are pattern spaces defined by vector x which have been set respectively for normal shadows, malignant shadows (the cancer part shadow in the abnormal tissue distribution) and benignant shadows (the benignant part shadow in the abnormal tissue distribution) on the basis of the result of investigation on a lot of prospective abnormal shadows. For example, the pattern class w1 of normal shadows is defined by the average of the vectors x of normal shadows, the pattern class w2 of malignant shadows is defined by the average of the vectors x of malignant shadows, and the pattern class w3 of benignant shadows is defined by the average of the vectors x of benignant shadows.

After, the Mahalanobis distance Dm1 between the pattern of the prospective abnormal shadow as detected by the iris filter processing and the normal shadow pattern, the Mahalanobis distance Dm2 between the pattern f the prospective abnormal shadow and the malignant shadow pattern, and the Mahalanobis distance Dm3 between the pattern f the prospective abnormal shadow and the benignant shadow pattern, the judging means 53 compares the Mahalanobis distance Dm1 between the pattern of the prospective abnormal shadow as detected by the iris filter processing and the normal shadow pattern with the Mahalanobis distance Dm2 between the pattern of the prospective abnormal shadow and the malignant shadow pattern and with the Mahalanobis distance Dm3 between the pattern of the prospective abnormal shadow and the benignant shadow pattern.

In this comparison, first and second likelihood ratios LR1 and LR2 defined by the following formulae (14) and (15) are employed.

$$LR1 = Dm1/Dm2 \qquad (14)$$

$$LR2 = Dm1/Dm3 \qquad (15)$$

The first likelihood ratio LR1 may be weighted as shown in the following formula (16).

$$LR1 = Dm1/Dm2 \cdot W1 \cdot W2 \qquad (16)$$

wherein W1 may be a coefficient based on the difference between the right and left breasts and W2 may be a coefficient based on the age or the position of the prospective abnormal shadow.

Figure 11A:
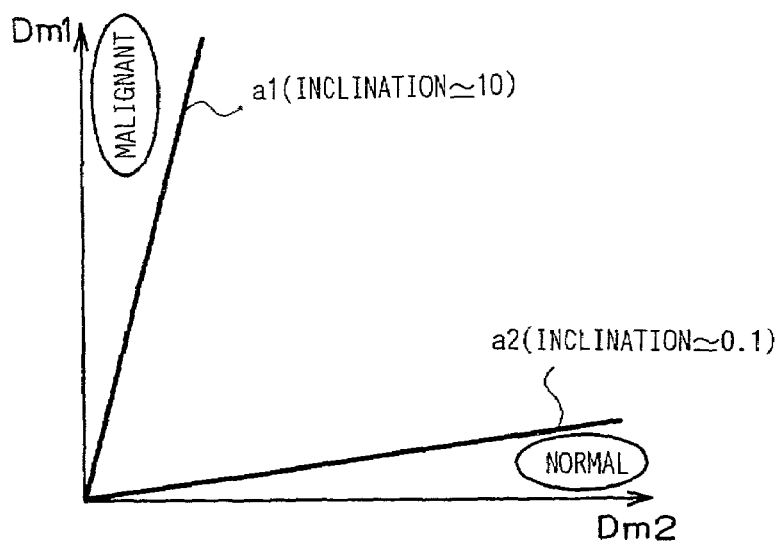
FIG. 11A is a conceptional view showing the relation between the first likelihood ratio LR1 and the Mahalanobis distance Dm1 from the normal tissue distribution and the Mahalanobis distance Dm2 from the cancer distribution.
Figure 11B:
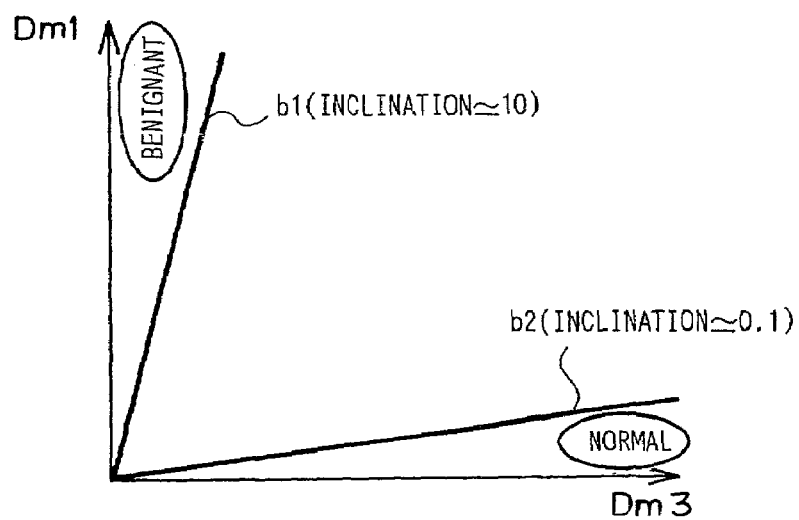
FIG. 11B is a conceptional view showing the relation between the second likelihood ratio LR2 and the Mahalanobis distance Dm1 from the normal tissue distribution and the Mahalanobis distance Dm3 from the benignant distribution.
Figure 11C:
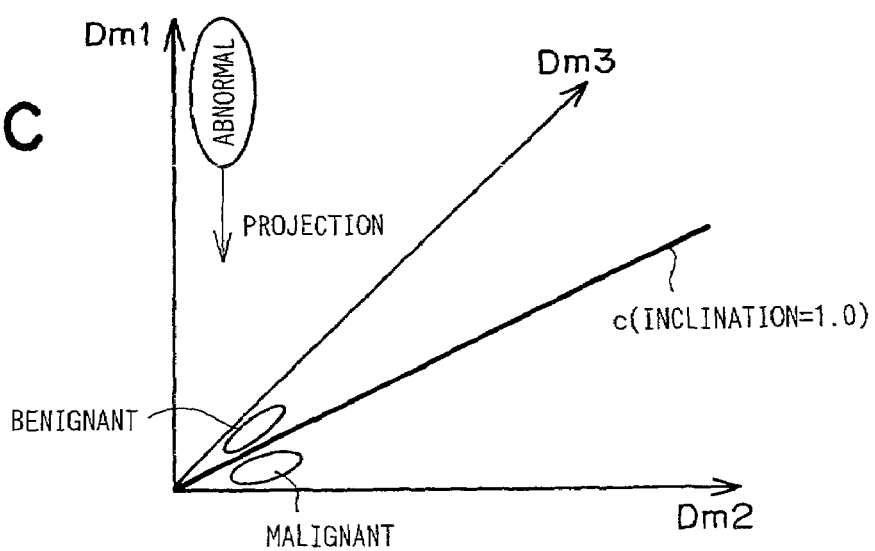
FIG. 11C is a conceptional three-dimensional view showing the relation between the first likelihood ratio LR1 and the Mahalanobis distance Dm1 from the normal tissue distribution and the Mahalanobis distance Dm2 from the cancer distribution and the relation between the second likelihood ratio LR2 and the Mahalanobis distance Dm1 from the normal tissue distribution and the Mahalanobis distance Dm3 from the benignant distribution.

FIG. 11A is a conceptional view showing the relation between the first likelihood ratio LR1 and the Mahalanobis distance Dm1 from the normal tissue distribution and the Mahalanobis distance Dm2 from the cancer distribution, FIG. 11B is a conceptional view showing the relation between the second likelihood ratio LR2 and the Mahalanobis distance Dm1 from the normal tissue distribution and the Mahalanobis distance Dm3 from the benignant distribution, and FIG. 11C is a conceptional three-dimensional view showing the relation between the first likelihood ratio LR1 and the Mahalanobis distance Dm1 from the normal tissue distribution and the Mahalanobis distance Dm2 from the cancer distribution and the relation between the second likelihood ratio LR2 and the Mahalanobis distance Dm1 from the normal tissue distribution and the Mahalanobis distance Dm3 from the benignant distribution. In FIGS. 11A to 11C, the inclination of the straight line represents the likelihood ratio.

When the prospective abnormal shadow as detected by the iris filter processing is a shadow of real malignant growth, the Mahalanobis distance Dm2 from the cancer distribution is small and the Mahalanobis distance Dm1 from the normal tissue distribution is large. That is, when the prospective abnormal shadow as detected by the iris filter processing is a shadow of real malignant growth, the line representing the relation between the first likelihood ratio LR1 and the Mahalanobis distance Dm1 from the normal tissue distribution and the Mahalanobis distance Dm2 from the cancer distribution generally appears on the left upper side of line a1 which is large in inclination (e.g., about 10) as shown in FIG. 11A. To the contrast, when the prospective abnormal shadow as detected by the iris filter processing is not a shadow of real malignant growth but a shadow of a normal tissue mistaken for an abnormal shadow, the line representing the relation between the first likelihood ratio LR1 and the Mahalanobis distance Dm1 from the normal tissue distribution and the Mahalanobis distance Dm2 from the cancer distribution generally appears on the right lower side of line a2 which is small in inclination (e.g., about 0.1) as shown in FIG. 11A.

Similarly, when the prospective abnormal shadow as detected by the iris filter processing is a shadow of real benignant growth, the Mahalanobis distance Dm3 from the benignant distribution is small and the Mahalanobis distance Dm1 from the normal tissue distribution is large. That is, when the prospective abnormal shadow as detected by the iris filter processing is a shadow of real benignant growth, the line representing the relation between the first likelihood ratio LR1 and the Mahalanobis distance Dm1 from the normal tissue distribution and the Mahalanobis distance Dm3 from the benignant distribution generally appears on the left upper side of line b1 which is large in inclination (e.g., about 10) as shown in FIG. 11B. To the contrast, when the prospective abnormal shadow as detected by the iris filter processing is not a shadow of real growth but a shadow of a normal tissue mistaken for an abnormal shadow, the line representing the relation between the second likelihood ratio LR2 and the Mahalanobis distance Dm1 from the normal tissue distribution and the Mahalanobis distance Dm3 from the benignant distribution generally appears on the right lower side of line b2 which is small in inclination (e.g., about 0.1) as shown in FIG. 11B.

When the prospective abnormal shadow as detected by the iris filter processing is a shadow of malignant growth, the Mahalanobis distance Dm2 from the malignant distribution is smaller than the Mahalanobis distance Dm3 from the benignant distribution. To the contrast, when the prospective abnormal shadow as detected by the iris filter processing is a shadow of benignant growth, the Mahalanobis distance Dm3 from the benignant distribution is smaller than the Mahalanobis distance Dm2 from the malignant distribution. Accordingly, whether the prospective abnormal shadow as detected by the iris filter processing is a shadow of malignant growth or a shadow of benignant growth can be discriminated by comparing the Mahalanobis distance Dm2 from the malignant distribution and the Mahalanobis distance Dm3 from the benignant distribution. That is, when the first likelihood ratio LR1 is larger than the second likelihood ratio LR2, the probability that the prospective abnormal shadow as detected by the iris filter processing is a shadow of malignant growth is stronger than the probability that the prospective abnormal shadow as detected by the iris filter processing is a shadow of benignant growth, and when the first likelihood ratio LR1 is smaller than the second likelihood ratio LR2, the probability that the prospective abnormal shadow as detected by the iris filter processing is a shadow of benignant growth is stronger than the probability that the prospective abnormal shadow as detected by the iris filter processing is a shadow of malignant growth. This means in FIG. 11C that the parts having a stronger probability that it is an abnormal shadow concentrates on an area near to axis Dm1, and when the area is projected onto Dm2-Dm3 plane, the malignant parts are positioned on the right lower side of line c whose inclination is 1.0 and the benignant parts are positioned on the left upper side of the line c.

On the basis of the fact described above, in step B8, it is determined that the prospective abnormal shadow as detected by the iris filter processing is malignant when the first likelihood ratio LR1 is larger than the second likelihood ratio LH2 and at the same time the first likelihood ratio LR1 is larger than a first threshold value Th1 which corresponds to the inclination of line a1, and it is determined that the prospective abnormal shadow as detected by the iris filter processing is benignant when the first likelihood ratio LR1 is smaller than the second likelihood ratio LH2 and at the same time the second likelihood ratio LR2 is larger than a second threshold value Th2 which corresponds to the inclination of line b1. Otherwise, it is determined that the prospective abnormal shadow as detected by the iris filter processing is a shadow of a normal tissue.

In this manner, the growth shadow P1 which cannot be distinguished from the pseudo-abnormal-shadow P3 only by the iris filter processing can be distinguished from the pseudo-abnormal-shadow P3 and at the same time, whether the prospective abnormal shadow as detected by the iris filter processing is malignant or benign can be distinguished.

As can be seen from the description above, the larger the first likelihood ratio LR1 is, the stronger the probability that the prospective abnormal shadow is malignant. Accordingly, the first likelihood ratio LR1 can be a malignancy evaluation function. Similarly, the larger the second likelihood ratio LR2 is, the stronger the probability that the prospective abnormal shadow is benign. Accordingly, the second likelihood ratio LR2 can be a benignancy evaluation function.

The judging means 53 of the malignancy judging section 50 takes, as indexes K, the feature values obtained in the prospective abnormal shadow detecting processing (e.g., the degree of convergence of gradient vectors, the output value I of the iris filter or the morphology filter, and the like) for the parts or the areas of the mammogram other than those determined to be normal in step B8, and calculates the margins of the indexes K against the respective threshold values T (e.g., K/T, 100×(K−T)/K%, and K−T). Then the judging means 53 inputs the indexes K and their margins into the image output means 30.

The prospective abnormal shadows P1 which are still taken as prospective abnormal shadows after the malignancy judging processing are input into the interest area setting means 20. The interest area setting means 20 sets areas of a predetermined shape (e.g., a circle or a square) including therein one of the prospective abnormal shadows as interest areas.

The interest area setting means 20 inputs image information W0 and coordinate information W1 on the interest areas in to the image processing means 40. The image processing means 40 carries out desired processing, e.g., enlargement processing or frequency enhancement processing, on the image information W0 on the interest areas and obtains processed interest area image information W. Then the image processing means 40 inputs the processed interest area image information W into the image output means 30 as the prospective abnormal shadow.

Into the image output means 30, the overall image data P on the basis of which the interest areas are set, and the indexes K and their margins for the prospective abnormal shadow P1 are also input, and the image output means 30 displays the overall image P, the processed interest area image W, the indexes K and their margins in one frame as shown in FIGS. 12A and 12B. The image output means 30 displays ROI frames, representing the positions and the sizes of the interest areas, on the overall image P in different colors by the malignancy or the benignancy of the prospective abnormal shadows. Though, in FIG. 12A, mammograms P and P' of the left and right breasts are displayed back to back in one frame, the layout of the frame need not be limited to such a layout. For example, mammograms of the left and right breasts may be displayed alternately.

Further, malignant prospective abnormal shadows may be marked with, for instance, red arrows with benignant prospective abnormal shadows marked with, for instance, blue arrows while the malignancy and/or the benignancy for the respective prospective abnormal shadows are displayed together with the prospective abnormal shadows.

In the prospective abnormal shadow detecting system 1 of this embodiment, pseudo-abnormal-shadows P3 which cannot be distinguished from a real prospective abnormal shadow P1 by the iris filter processing only can be distinguished from the latter. Further, since the prospective abnormal shadows as detected by the iris filter processing are divided into normalcy, malignancy (cancer) and benignancy (not cancer though being an abnormal shadow) and displayed in such a manner that whether the prospective abnormal shadows as detected by the iris filter processing are normal, malignant or benignant can be distinguished, it becomes feasible to distinguish a malignant shadow which should be treated at once or a prospective abnormal shadow which should be watched though need not be treated at once, which contributes to diagnosis.

In Japanese Unexamined Patent Publication No. 9(1997)-167238, the Mahalanobis distance from the pattern of a normal shadow and that from the pattern of an abnormal shadow (the Mahalanobis distance from an abnormal tissue distribution including both benignancy and malignancy) are compared with each other. This only contributes to increasing accuracy in detecting prospective abnormal shadows and cannot discriminate malignancy and benignancy from each other. To the contrast, in the prospective abnormal shadow detecting system 1 of this embodiment, since the Mahalanobis distance from the malignant distribution and the Mahalanobis distance from the benignant distribution are calculated separately from each other, accuracy in detecting the prospective abnormal shadows is increased and at the same time, malignancy and benignancy can be discriminated from each other.

Further, since the indexes on the basis of which prospective abnormal shadows are extracted and/or the margins of the indexes K against the respective threshold values T are displayed together with the overall mammogram and the prospective abnormal shadows, the shadow reader can be provided with more detailed information on the prospective abnormal shadows.

Though a prospective abnormal shadow detecting system in accordance with a preferred embodiment of the present invention is described above, the present invention need not be limited to the preferred invention but may be variously modified.

For example, though, in the embodiment described above, the Mahalanobis distance is employed as the evaluation function for determining whether the prospective abnormal shadow is normal, malignant or benignant, other evaluation functions may be used.

The prospective abnormal shadow can be expressed in an n-dimensional pattern space using values on n-dimensional feature axes corresponding to n-dimensional feature values $x1, x2, x3, \ldots, xn$. Provided that resemblance between input shadow patterns is kept sufficient in the n-dimensional pattern space thus obtained, that is, similar shadow patterns are close to each other even in the pattern space, features can be extracted and whether the shadow is malignant or benignant can be known by the use of, for instance, an evaluation function value (distance function value) representing a concept of distance taking into account spread of shadow patterns and the like. The Mahalanobis distance used in the embodiment described above is a typical evaluation function value representing a distance taking into account spread of shadow patterns. However, a city block distance, a chessboard distance, a Minkowski distance or the like may be employed in place of the Mahalanobis distance.

Evaluation function values other than those representing a concept of distance can be employed. For example, Fisher's discrimination functions for benignancy and malignancy may be employed as disclosed, for instance, in Japanese Unexamined Patent Publication No. 9(1997)-167238. In this case, in step B6 in FIG. 2, scalars on both benignancy and malignancy of the respective prospective abnormal shadows as detected by the iris filter processing are calculated according to a predetermined formula and are respectively compared with a benignancy threshold value and a malignancy threshold value which are empirically set through investigation of lots of benignant abnormal shadows and lots of malignant abnormal shadows.

Further, though in the embodiment described above, indexes on edge information only are employed, for example, indexes on histogram information or a combination of some indexes on histogram information and some indexes on edge information may be employed in setting evaluation function values for benignancy and malignancy.

Also in these modifications, likelihood ratios may be employed in the manner similar to that in the embodiment described above.

Further, though, in the embodiment described above, whether prospective growth shadows as detected by the iris filter processing is normal, malignant or benignant is judged, for instance, whether prospective calcification shadows as detected by the morphology filter processing is normal, malignant or benignant may be judged.

Further, though in the embodiment described above, whether prospective abnormal shadows as detected by the iris filter processing is normal, malignant or benignant is judged, the prospective abnormal shadows may be divided only into malignancy and benignancy (including normalcy in this case)

Further, though in the embodiment described above, the present invention is applied to a mammogram, the present invention may be applied to any other radiation images such as a stomach radiation image.

What is claimed is:

1. A prospective abnormal shadow detecting system comprising a prospective abnormal shadow detecting means which detects a prospective abnormal shadow in an image on the basis of image data representing the image and a prospective abnormal shadow information output means which outputs information on the prospective abnormal shadow detected by the prospective abnormal shadow detecting means, wherein the improvement comprises that
   a malignancy judging means which judges whether the prospective abnormal shadow detected by the prospective abnormal shadow detecting means is malignant or benignant is provided, and
   the prospective abnormal shadow information output means outputs the information on the prospective abnormal shadow in such a manner that whether the prospective abnormal shadow is malignant or benignant as judged by the malignancy judging means can be distinguished, and
   in which the malignancy judging means judges whether the prospective abnormal shadow detected by the prospective abnormal shadow detecting means is malignant or benignant by
   obtaining a benignancy evaluation function value which is a value of an evaluation function for benignancy, a malignancy evaluation function value which is a value of an evaluation function for malignancy, and a normalcy evaluation function value which is a value of an evaluation function for normalcy by defining feature values of the image data by a predetermined function, and
   comparing the normalcy evaluation function value with the benignancy evaluation function value and the normalcy evaluation function value with the malignancy evaluation function value, and
   in which the malignancy judging means obtains first and second likelihood ratios LR1 and LR2 which are respectively defined to be LR1=normalcy evaluation function/malignancy evaluation function and LR2=normalcy evaluation function/benignancy evaluation function, and determines that the prospective abnormal shadow is malignant when the first likelihood ratio LR1>the second likelihood ratio LR2 and at the same time, the first likelihood ratio LR1>a first threshold value, and that prospective abnormal shadow is benignant when the first likelihood ratio LR1<the second likelihood ratio LR2 and at the same time, the second likelihood ratio LR2>a second threshold value, and otherwise that the prospective abnormal shadow is a shadow of a normal part.

2. A method of judging whether a prospective abnormal shadow detected on the basis of image data representing an image is malignant or benignant comprising the steps of
   obtaining a benignancy evaluation function value which is a value of an evaluation function for benignancy, a malignancy evaluation function value which is a value of an evaluation function for malignancy, and a normalcy evaluation function value which is a value of an evaluation function for normalcy by defining feature values of the image data by a predetermined function, and
   comparing the normalcy evaluation function value with the benignancy evaluation function value and the normalcy evaluation function value with the malignancy evaluation function value, and
   obtaining first and second likelihood ratios LR1 and LR2 which are respectively defined to be LR1=normalcy evaluation function/malignancy evaluation function and LR2=normalcy evaluation function/benignancy evaluation function, and
   determining that the prospective abnormal shadow is malignant when the first likelihood ratio LR1=the second likelihood ratio LR2 and at the same time, the first likelihood ratio LR1>a first threshold value, and that prospective abnormal shadow is benignant when the first likelihood ratio LR1<the second likelihood ratio LR2 and at the same time, the second likelihood ratio LR2>a second threshold value, and otherwise that the prospective abnormal shadow is a shadow of a normal part.

3. An apparatus for judging whether a prospective abnormal shadow detected on the basis of image data representing an image is malignant or benignant comprising
   an evaluation function value calculating means which obtains a benignancy evaluation function value which is a value of an evaluation function for benignancy, a malignancy evaluation function value which is a value of an evaluation function for malignancy, and a normalcy evaluation function value which is a value of an evaluation function for normalcy by defining feature values of the image data by a predetermined function, and
   judging means which judges whether the prospective abnormal shadow is malignant or benignant by comparing the normalcy evaluation function value with the benignancy evaluation function value and the normalcy evaluation function value with the malignancy evaluation function value,
   in which the judging means obtains first and second likelihood ratios LR1 and LR2 which are respectively defined to be LR1=normalcy evaluation function/malignancy evaluation function and LR2=normalcy evaluation function/benignancy evaluation function, and determines that the prospective abnormal shadow is malignant when the first likelihood ratio LR1>the second likelihood ratio LR2 and at the same time, the first likelihood ratio LR1>a first threshold value, and that prospective abnormal shadow is benignant when the first likelihood ratio LR1<the second likelihood ratio LR2 and at the same time, the second likelihood ratio LR2>a second threshold value, and otherwise that the prospective abnormal shadow is a shadow of a normal part.

* * * * *